US010050958B2

(12) United States Patent
Ganesan

(10) Patent No.: US 10,050,958 B2
(45) Date of Patent: Aug. 14, 2018

(54) VALIDATING BIOMETRICS WITHOUT SPECIAL PURPOSE READERS

(71) Applicant: Ravi Ganesan, San Diego, CA (US)

(72) Inventor: Ravi Ganesan, San Diego, CA (US)

( * ) Notice: Subject to any disclaimer, the term of this patent is extended or adjusted under 35 U.S.C. 154(b) by 0 days.

(21) Appl. No.: 15/586,979

(22) Filed: May 4, 2017

(65) Prior Publication Data

US 2017/0237731 A1 Aug. 17, 2017

Related U.S. Application Data

(63) Continuation of application No. 14/665,174, filed on Mar. 23, 2015, now Pat. No. 9,712,525.

(60) Provisional application No. 61/970,259, filed on Mar. 25, 2014.

(51) Int. Cl.
*H04L 29/06* (2006.01)
*H04W 12/06* (2009.01)

(52) U.S. Cl.
CPC ...... *H04L 63/0853* (2013.01); *H04L 63/0861* (2013.01); *H04W 12/06* (2013.01)

(58) Field of Classification Search
None
See application file for complete search history.

(56) References Cited

U.S. PATENT DOCUMENTS

| 2006/0206709 A1 | 9/2006 | Labrou et al. |
| 2014/0279516 A1* | 9/2014 | Rellas ............... G06Q 30/0185 705/44 |
| 2015/0257004 A1* | 9/2015 | Shanmugam ....... H04L 63/0853 455/411 |

* cited by examiner

*Primary Examiner* — Leon-Viet Nguyen
(74) *Attorney, Agent, or Firm* — Sughrue Mion, PLLC

(57) ABSTRACT

To validate a user's identity a network validation server receives a smartphone image of a preexisting user credential, including both a user biometric and a unique identifier associated with the credential and stores them in a database. The validation server also receives the unique identifier from a registrar network device seeking to validate the user, and in response transmits a validation code to the user's smartphone for display by the user's smartphone and/or the registrar's network device for display by the registrar's network device. The validation server additionally receives confirmation from the registrar's network device that a validation code displayed on the user's smartphone is the transmitted validation, thereby confirming that the user has been validated by the registrar.

18 Claims, 1 Drawing Sheet

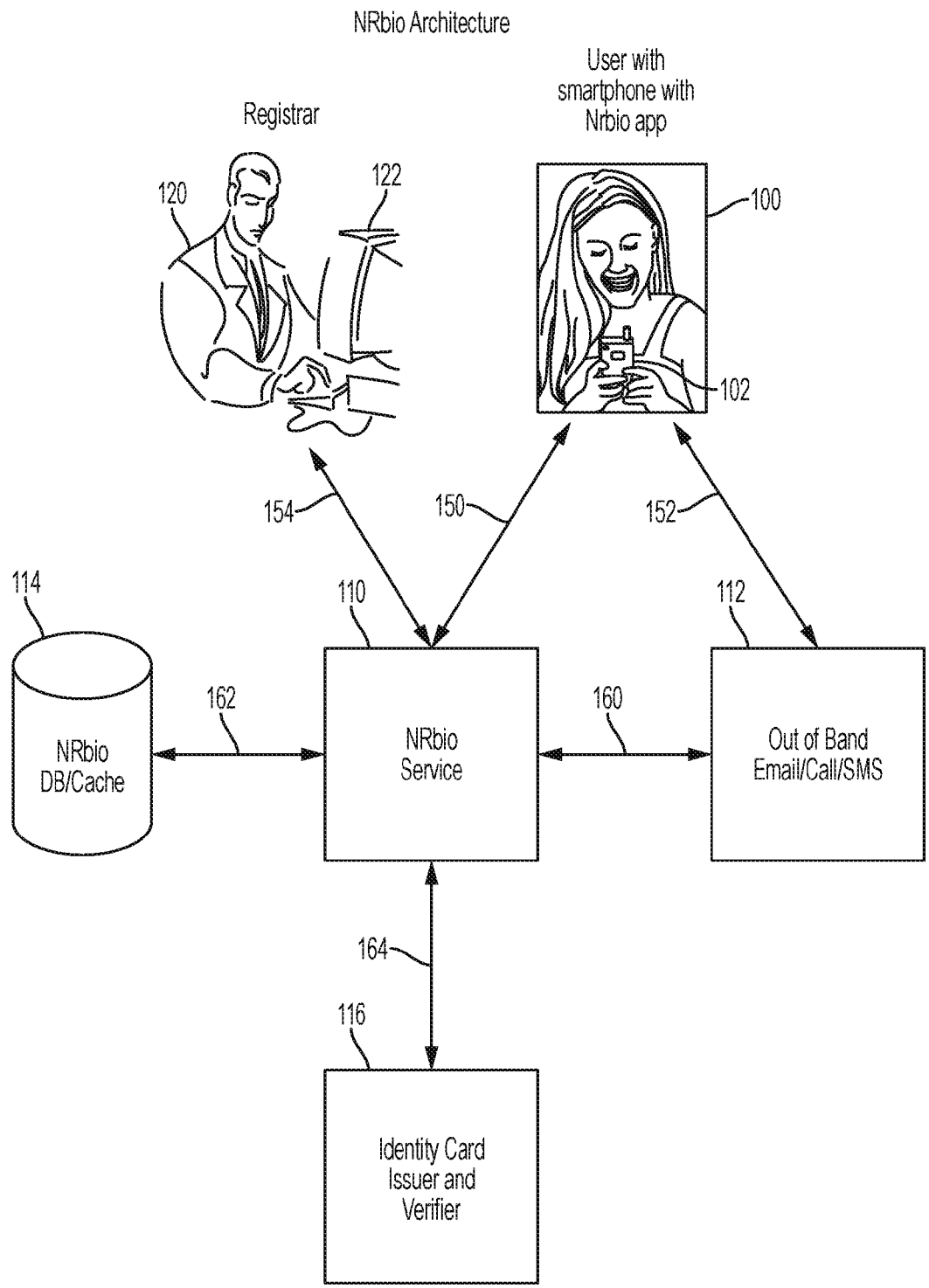

VALIDATING BIOMETRICS WITHOUT SPECIAL PURPOSE READERS

CROSS-REFERENCE TO RELATED APPLICATIONS

This application is a continuation of application Ser. No. 14/665,174, filed Mar. 23, 2015, which claims priority based on Provisional Application Ser. No. 61/970,259, filed Mar. 25, 2014, and entitled "NOREADERBIO (NRBIO): A NOVEL APPROACH TO VALIDATING SMARTCARD BASED BIOMETRICS WITHOUT SPECIAL PURPOSE READERS", the contents of which are incorporated herein in their entirety by reference.

FIELD OF INVENTION

The present invention relates generally to validating the identity of an individual based on a credential, and more particularly to validating using biometrics without special purpose readers. It will be recognized by those skilled in the art that such validation is now also commonly referred to as "proofing".

BACKGROUND

Conventional Proofing Using Photo Based Biometric

A driver's license or passport (sometimes referred to below as an "ID") contains (i) the picture of a user, (ii) printed information, and (iii) an electronic mechanism to store information. The later can be a mag stripe, a quick response (QR) code, or an electronic chip, etc.

A user typically presents it (i.e. his or her driver's license or passport) to an official we shall call a "registrar" as proof of identity.

In the simplest case, the registrar simply compares the photo on the driver's license or passport to the individual in front of him/her and, if there is a match, assumes identity has been proofed.

In the higher assurance case, the registrar swipes the ID (or scans the QR code, or has a device that talks to the chip), retrieves the data, which is sent to a central database that verifies the information on the card, i.e. on the driver's license or passport. Now the registrar is verifying both the photo and the accuracy of the information on the card.

Authentication Techniques

Out of Band Authentication (OOBA):

Invented fifteen years ago for remote authentication, the concept was that a web service which wanted to authenticate a user, would itself, or via an OOBA service provider, call or send a short message service (SMS) message (now commonly referred to as a text message), to a phone number believed, a priori, to belong to the user. A simple code could be sent, either verbally via such a call or in text included in such an SMS message, to the user who, if he/she entered it into the web service (i.e. entered the code into the web service webpage), proved that he/she had access to that phone number. Several variations of such services are currently widely in use.

Quasi Out of Band Authentication (QOOBA):

OOBA uses the phone network to place a call or send an SMS message for each authentication. More recently, the OOBA concept was extended to use the Internet. A call/SMS/Email is used to activate a smartphone app that then has an "always on" connection to the QOOBA service in the Internet. Just as in OOBA, the web service can send messages to the user, however, without the inconvenience and cost of an individual call/SMS message for each authentication.

3pTALK:

Still more recently, QOOBA was further extended into a service commonly referred to as 3pTALK. In this further innovation, an invisible public key infrastructure (PKI) deployment is done to all parties, and digitally signed and encrypted messages can be sent between any of the parties. An escrow service allows for auditability.

Validating Identity Using Smartphones

Smartphones have several advantages as a security device:

(i) they are ubiquitous,
(ii) people usually quickly realize it if they have misplaced it,
(iii) they can be deactivated remotely,
(iv) they can be traced if used after stolen, and so on.

As we move towards a "walletless world", countless proposals have been extended to achieve the objective of putting IDs on smartphones. Most involve putting secure chips on the smartphones, and deploying appropriate readers. Other related lower-tech techniques are like QR code based airline boarding passes that many people use on smartphones already.

Objectives

An objective of the present invention is to put IDs on smartphones but, as will be described in detail below, the approach taken to do so is decidedly different from those previously proposed. More specifically, it is an objective of the present invention to have a photo identifier, e.g. of a type as described above, carried on a smartphone and to use whatever device the registrar already has to validate or proof the identity of the smartphone user using the photo identifier.

Another objective of the present invention is to provide a solution that does not require changing out devices at every registrar, based on an assumption that the registrar has a personal computer (PC) or a smartphone with a browser.

It is a further objective of the present invention to achieve as much, or close to as much, of the security and convenience of secure chip based devices.

Additional objects, advantages, and novel features of the present invention will become apparent to those skilled in the art from this disclosure, including the following detailed description, as well as by practice of the invention. While the invention is described below with reference to particular embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF INVENTION

In accordance with aspects of the present invention, the identity of a user is validated by a validation service provider. The validation service provider is typically represented on the applicable network or networks (the term "network" as used herein should be understood to mean one or more networks, unless the context dictates otherwise) by a network server (sometimes referred to as a "validation server"), which executes logic, e.g. programmed instructions, stored on non-transitory storage media, such as memory or a hard disc, with the logic being configured to be executable by a server processor, e.g. a central processing unit (CPU) to thereby cause the processor to function as described below. As will be understood, one or more networks, as applicable, may be utilized in validating a user's identify. For example, the Internet and/or another network(s) may be used depending on the particular implementation environment Other network(s) could include one or more of currently existing networks, such as the automated teller machine (ATM) network or charge/debit card payment network, or virtually any network that would be appropriate to use in the applicable implementation.

In accordance with aspects of the invention, to validate a user the validation service provider receives a smartphone image of a preexisting credential of the user from a smartphone of a user via the network. The transmission of this smartphone image by the smartphone is driven by a validation app, i.e. logic, executing on the smartphone. The user's preexisting credential includes both a biometric of the user, such as a photograph, fingerprint or other biometric, and a unique identifier associated with the preexisting user credential. For example, the user's preexisting credential could be a driver's license having both the user's photograph and a unique driver's license number, or a passport having both the user's photograph and a unique passport number. The validation service provider stores the received smartphone image, preferably in a database in association with the unique identifier.

The validation service provider subsequently receives, via the network with which it communications with the user's smartphone or another network, the credential's unique identifier from a network device of a registrar seeking to validate the user. The transmission of the credential's unique identifier by the registrar's network device is driven by a validation application executing on the registrar's network device. The registrar's network device can be virtually any type of network compatible device. For example, it could be a point of sale (POS) terminal, or a personal computer, laptop computer or network site server (e.g. a website server), or an IPad, or a smartphone, or some other network device. In response to receipt of the unique identifier from the registrar's network device, the validation service provider transmits, via the applicable network(s), a validation code to (a) the user's smartphone, for display by the user's smartphone, with this display driven by a validation app executing on smartphone, or (b) the registrar's network device for display by the registrar's network device, with this display driven by a validation application executing on the registrar's network device, or (c) both.

Next, the validation service provider receives, from the registrar's network device via the applicable network, confirmation that a validation code displayed on the user's smartphone is the transmitted validation. Here again, the transmission of this confirmation by the registrar's network device is driven by a validation application executing on the registrars network device. Receipt of the confirmation confirms to the validation service provider that the user has been validated by the registrar.

For example, in one exemplary implementation the validation code is sent to both the user's smartphone and the registrar's network device. The registrar's network device is a POS terminal and the user is physically at the POS terminal. It will be recognized that, in such a case, the user can show the smartphone screen displaying the validation code to cashier at the POS terminal. The cashier can then compare the validation code displayed on the user's smartphone screen with that displayed on the POS terminal to confirm that they match. The cashier can then take whatever step is necessary to cause the POS terminal to send the confirmation to the validation service provider.

On the other hand, in another exemplary implementation the user is not physically present at the POS terminal, e.g. the user wishes to make a purchase at an Internet website. In such a case, the user sends the validation code to the registrar's network device, e.g. to the Internet website server, and the registrar's network device confirms that the validation code received from the user's smartphone matches that received from the validation service provider in an automated manner.

In accordance with other aspects of the invention, after receipt of the confirmation, the validation service provider may also beneficially transmit the stored preexisting user credential image to the registrar's network device via the applicable network, so that the registrar's network device can display the image and the registrar can use it to further validate the user. Here also, the display is driven by a validation application executing on the registrar's network device.

According to a preferred aspect of the invention, prior to transmitting the validation code, the validation service provider validates (a) that the preexisting user credential associated with the received unique identifier remains valid, or (b) that a phone number of the user's smartphone is a phone number associated with a name of the user, or (c) both. These validations may be performed through various entities. Preferably, where possible, these validation are performed through a Government agency. However, reliable commercial entities may also provide reliable validation certain information, such as the association of a phone number and name.

If the user's smartphone includes the necessary functionality, preferably the validation service provider receives a notification, from the user's smartphone via the applicable network, that a biometric has been used to unlock the user's smartphone. Here again, transmission of this notice is driven by a validation application executing on the user's smartphone.

According to still other beneficial aspects of the invention, the validation service provider may again receive the preexisting user credential image from the user's smartphone via the applicable network. Here again, this transmission is driven by a validation app executing on the user's smartphone. In this case, the validation service provider transmits the again received preexisting user credential image to a network device of another registrar via the applicable network, for display by the other registrar's network device, with the display being driven by a validation application executing on the other registrar's network device.

The validation service provider next receives a request for a smartphone image of the user (commonly referred to as a "selfie") from the other registrar's network device via the applicable network. This transmission from the other registrar's network device is driven by a validation application executing on the other registrar's network device. In response to the received request, the validation service provider transmits a request for a smartphone image of the user to the user's smartphone via the applicable network, for display by the user's smartphone. This display is also driven by a validation app executing on the user's smartphone.

Thereafter, the validation service provider receives a smartphone image of the user from the validation app executing on the user's smartphone via the network. Here again, transmission of the smartphone image of the user by the smartphone is driven by a validation app executing on the user's smartphone. The validation service provider transmits the received smartphone image of the user to the other registrar's network device via the network, for display by the other registrar's network device. The other registrar can then comparison the displayed smartphone image of the user, with the image of the user included in the previously transmitted preexisting user credential image, to thereby validate the user to the other registrar. Here again, the display of the transmitted smartphone image of the user by the other registrar's network device is driven by a validation application executing on the other registrar's network device.

Preferably, prior to transmitting the again received preexisting user credential image, the validation service provider validates that the again received preexisting user credential remains valid.

Beneficially, the again received preexisting user credential image is signed with a digital signature of the user, and it is the received digitally signed preexisting user credential image that is transmitted to the other registrar's network device.

In some implementations it may be advantageous for the received request for the smartphone image of the user to be a request for a smartphone image of the user in a particular pose. In such a case, this is the request transmitted by the validation service provider to the user's smartphone.

BRIEF DESCRIPTION OF DRAWINGS

The FIGURE depicts a system architectural, including components and communications links, in accordance with the present invention.

DETAILED DESCRIPTION OF PREFERRED EMBODIMENT

The following description centers around a photo based biometric like a driver's license or a passport. This is done for simplicity of presentation. It should be noted however that the innovation generalizes to almost any smartphone based biometric. It will also be recognized by those skilled in the art that, although the description is presented in the context of a user using a smartphone, the invention can also be easily adapted for implementations in which, instead of a "smartphone", the user has a network (e.g. Internet) connectable device such as an iPad without a phone connection and that user also has access to a separate phone, e.g. a separate cellular or landline telephone.

The following is a detailed description of a preferred embodiment of the invention with reference to the FIGURE.

As shown in the FIGURE, the system architecture includes a smartphone 102 operated by a user 100, an NRbio service 110, and a computer 122 operated by a registrar 120. As will be recognized by those skilled in the art from the FIGURE and the description below, the NRbio service 110 is represented on the network by a network, i.e. Internet, server. As is well understood in the art, network servers typically include a processor for executing instructions, i.e. logic, such as software applications, data storage (such as volatile storage, e.g. RAM memory, for temporarily storing executable instructions and data, and non-volatile storage, e.g. a hard disk, for more permanently storing executable instructions and data), and communications ports for communicating with other entities over a network or with other devices off the network. Also included are an out of band Email/Call/SMS service 112, NRbio database (DB)/Cache 114, and identify card issuer and verifier 116. As shown, the user's smartphone 102 is communicatively connectable to the NRbio service 110 via a communications link 150, and the NRbio service 110 is communicatively connectable to the NRbio service 110 via a communications link 154, both of these communications links preferably being Internet communications links. The user's smartphone is also communicatively connectable to the out of band Email/call/SMS service 112 via a communications link 152, which may preferably be an Internet communications link, if it is used to communicate via email, or a cellular communications link, if used to communicate via a call or SMS message. Also depicted are communications link 160 between the NRbio service 110 and the out of band Email/call/SMS service 112, communications link 162 between the NRbio service 110 and the NRbio database/cache 114, and communications link 164 between the NRbio service 110 and the identify card issuer and verifier 116, which can be of any of the various well known types communications links that will be suitable in view of the functions and operations described in detail below.

The No Reader Bio (NRbio) Process 1: Registration and Login

User and Registrar Registration (1). User 100 downloads NRbio app (not shown) to her smartphone 102 via Internet communications link 150 from the NRbio service 110, and activates it (i.e. the downloaded NRbio app) using an out of band Email/Call/SMS process 112. As will be well understood by those skilled in the art, this conventional activation process includes the NRbio service 110 initiating an out of band Email/call/SMS 112 to the user's smartphone 102 (i.e. to a phone number or email address believed, a priori, to belong to the user) via communications link 160 and cellular (if to a phone number) or Internet (if to an email address) communication link 152 to convey a code, such as 12345, to the user. The user 100 enters the code on an Internet webpage displayed by the NRbio service 110 on the user's smartphone 102 via the Internet communications link 150, the entered code is communicated back to the NRbio service 110 via the Internet communications link 150. If the code received by the NRbio service 110 from the user's smartphone 102 is the same as the code communicated by the NRbio service 110 to the user's smartphone 102 via the out of band Email/call/SMS 112, the user has proved that he/she had access to that phone number or email address and the NRbio service 110 activates the NRbio app previously downloaded to the user's smartphone 102.

This event happens rarely. From then on the NRbio app has an "always on" connection to the NRbio service.

(2). The user 100 can then register one or more biometrics with the NRbio service 110. For instance the user 100 could select "driver's license", at which point he/she will be prompted, by the NRbio app, to take a photo of the license using smartphone 102, and then enter the information on it into the NRbio app. Or the user might take a photo of himself or herself (commonly referred to as a "selfie" and typically an close-up photo of the user's face) and simply register his/her name (in this case NRbio service 110 has strongly authenticated the user's email address/phone number, but has not validated the user's name, though this could be achieved using other techniques that are well known to those skilled in the art). In either case, the photo is communicated by the NRbio app executing on the user's smartphone 102 to the NRbio service 110 via Internet communications link 150.

(3). If an identity card is being registered and the issuer has a verification process, then NRbio service 110 will verify the validity of the information entered by the user.

Registrar Registration

If the registrar 120 is another user at a smartphone (not shown) then the above process is similar and might happen rarely. On the other hand if the registrar is at a computer 122 in an office environment, the registrar might login using any login credential, including potentially the email/call/SMS approach similar to that described above. The registrar 120 must be pre-established as a valid NRbio service 110 user.

NRbio Process 2: in Person Vetting at Registrar

In our first option, the user 100 simply opens the NRbio app, selects say "driver's license" and shows it, as it is displayed on smartphone 102, to the registrar 120. The registrar 120 (i) verifies that the photo displayed on smartphone 102 matches the individual, i.e. in this case user 100, holding the smartphone, and (ii) enters the driver's license number into the NRbio application (not shown) executing on computer 122. The NRbio system 110 (iii) is sent the license number by the NRbio application executing on computer 122 via Internet communications link 154, and retrieves the user information, which is stored in the NRbio DB or cache memory 114, over communications link 162, (iv) it contacts the verification system 116, if available, to ensure the user identity card information is still valid via communications link 164, and (v) it displays a code on the user's smartphone 102 NRbio app, say ABC123, and displays the same code on the registrar's computer 122 NRbio app (this is a crucial matching step to ensure authenticity of the user 100; an imposter would have to look like the real user 100 AND steal their smartphone 102 to impersonate the user). (vi) Once the registrar 120 confirms that the codes match (by comparing the code displayed on the user's smartphone 102 with that displayed on the registrar's computer 122, the information from the identify card, e.g. the license number from the driver's license, is sent automatically to the registrar 120, that is to the registrar's computer 122 via communication Internet link 154, along with a copy of the identity card, e.g. the driver's license (this information can be auto entered into the registrar's system 122 saving them the trouble of typing it in).

Observe that not only has the registrar 120 verified the user's identity card, they have also in effect verified the authenticity of the phone number of the user's smartphone 102. There are several variations to this approach. For example, the registrar 100 could provide a random code to the user who enters it into the NRbio app executing on the user's smartphone 102, which sends it to the NRbio service 110 via Internet communications link 150, and back to the registrar via Internet communications link 154 to registrar computer 122. These multiple alternatives to the core innovation will be obvious to those skilled in the art.

NRbio Process 2: Remote Vetting at Registrar

Now we have a different problem as the user is not in front of the registrar. However, through some innovative techniques we can still make authentication possible.

In our first option the user 100 establishes contact with the registrar's NRbio system (i.e. the registrar's computer 122 executing the NRbio application) using the user's NRbio app (i.e. the NRbio app executing on the user's smartphone 102). This contact is made via the NRbio service 110 (i.e. using network, here Internet, communications links 150 and 154). The user 100 then selects the appropriate identity, say a driver's license, and sends it (i.e. the image of the user's driver's license) to the registrar. That is, the user 100 selects the user's driver's license on the NRbio app executing on the user's smartphone 102, and the smartphone is directed by the NRbio app to transmit the previously taken image of the user's driver's license to the NRbio service 110 via Internet communications link 150. The NRbio service 110 can choose to re-verify the data en route if needed. That is, the NRbio service 110 can choose to again verify that the user's driver's license is valid by checking with the identify card issuer and identifier 116, if available, via communications link 164, prior to transmitting the image of the driver's license received from the user's smartphone 102 to the registrar's computer 122 via Internet communications link 154. At this point the registrar 120 knows the phone number of the user 100 with certainty (as the NRbio service 110 knows the number and optionally communicates it to the registrar 120), and has a valid driver's license, but does not know if the user 100 at the other end is the actual owner of the license.

One innovative solution would be to request the user 100 via the NRbio service 110 to use their NRbio app (i.e. the NRbio app executing on the user's smartphone 102) to take a 'selfie' which is sent to the registrar 120. That is, the user 100 takes a picture of himself or herself (i.e. what is commonly referred to as a "selfie") with the smartphone 102 and enters the information on it into the NRbio app executing on the user's smartphone 102. The NRbio app directs the user's smartphone 102 to transmit the selfie to the NRbio service 110 via Internet communications link 150 and the NRbio service 110 further transmits the received selfie to the NRbio application executing on the registrar's computer 122, which displays the received selfie. The registrar compares the "selfie" to the picture on the identity card (i.e. in this example to the picture on the previously received user's driver's license). To defeat sophisticated hackers who try to spoof the "selfie" process, the registrar could communicate (i.e. via the NRbio service 110 and communications links 154 and 150) a number between 1 and 5 and have the user send a selfie holding up that many fingers on the free hand. This process could even be repeated a few times to in effect make the user communicate a simple numeric code.

Other multiple alternatives to the core innovation will be obvious to those skilled in the art.

Other Variations

Note that one could easily equip the NRbio app (i.e. the NRbio app executing on the user's smartphone 102) to be a Public Key Infrastructure (PKI) system, and have the user 100 communicate a digitally signed identity card (e.g. a digitally signed driver's license) to the registrar 120. That is, as will be well recognized by those skilled in the art, the private crypto-key of the private/public PKI crypto-key pair of the user 100, can be used by the NRbio app executing on the user's smartphone 102 to digitally sign (i.e. transform), and thereby encrypt, the identity card to be communicated to the registrar 120 via the NRbio service 110. As will also be recognized, in such a case the NRbio application executing on the registrar's computer 122 will apply the public crypto-key of the user's private/public PKI crypto-key pair to complete the signature on (i.e. transform), and thereby decrypt, the communicated digitally signed identity card, and will display the decrypted identity card to the registrar 100.

If other databases with access to a secure telephone directory are available, then that information could be cross referenced. As will also be well understood by those skilled in the art, when the user's name and phone number are provided to the NRbio service 110, there is absolutely no way for the NRbio service 110 to know whether or not the name and phone number match. This is not generally a problem, because the NRbio service 110 is not concerned with binding the name, address, phone, email, device, person, as that is primarily a registrar's job. However, as will also be recognized by those skilled in the art, it could be beneficial for the NRbio service 110, where possible, to do some bindings. For example, if the user 100 logs in to the NRbio service 110 and is authenticated using an out of band authentication phone call 112 to his/her smartphone 102, the NRbio service 110 knows that someone who claims he/she is the user is at that phone number. If the NRbio service 110 also has access to a secure telephone directory, the NRbio service 110 could beneficially verify that yes the number called is the applicable user's smartphone number.

The system could potentially be used to confirm the presence of a local biometric on the smartphone 102 (e.g. a fingerprint reader). As will also be well understood by those skilled in the art, many smartphones currently have fingerprint readers. While, at present such readers are typically used to unlock the smartphone, those skilled in the art have also recognized the benefit of including functionality within the smartphone that would facilitate the smartphone letting a network (e.g. Internet) server know that the user at the other end of a communication link has used a biometric to unlock his/her device. Hence, the presence of a local biometric, e.g. a finger print, on the smartphone 102 could also be confirmed to the NRbio service 110.

The entire process can be used to create a digital notary, including one who does not require the user 100 to be physically present. Documents can be sent back and forth with digital signatures.

Other multiple alternatives to the core innovation will be obvious to those skilled in the art.

As described in detail above, the present invention provides a technique for putting IDs on smartphones using a very different approach from those previously proposed. According to the present invention a photo identifier, e.g. of a type as described above, can be carried on a smartphone and used with whatever device the registrar already has to validate or proof the identity of the smartphone user using the photo identifier. Furthermore, the present invention provides a solution that does not require changing out devices at every registrar, based on an assumption that the registrar has a personal computer (PC) or a smartphone with a browser. Further still, the present invention achieves as much, or close to as much, of the security and convenience of secure chip based devices.

I claim:

1. A method of validating the identity of a user, comprising:
    receiving, via a network by a validation service provider from a validation app executing on a smartphone of a user, a smartphone image of a preexisting credential of the user including both a biometric of the user and a unique identifier associated with the preexisting user credential;
    storing, by the validation service provider, the received smartphone image;
    receiving, via the network by the validation service provider from a validation application executing on a network device of a registrar seeking to validate the user, the unique identifier associated with the preexisting user credential;
    transmitting, via the network in response to receipt of the unique identifier associated with the preexisting user credential, a validation code from the validation service provider to one of or both (a) the user's smartphone for display by the validation app executing on the user's smartphone and (b) the registrar's network device for display by the validation application executing on the registrar's network device; and
    receiving, via the network by the validation service provider from the validation application executing on the registrar's network device, confirmation that a validation code displayed on the user's smartphone is the transmitted validation, thereby confirming that the user has been validated by the registrar.

2. The method according to claim 1, further comprising:
    after receipt of the confirmation, transmitting, via the network, the stored preexisting user credential image from the validation service provider to the registrar's network device for display by the validation application executing on the registrar's network device, and use by the registrar to further validate the user.

3. The method according to claim 1, wherein:
    the network is the Internet; and
    the preexisting user credential is one of (i) a driver's license including both the user's photograph and a unique driver's license number and (ii) a passport including both the user's photograph and a unique passport number.

4. The method according to claim 1, further comprising:
    prior to transmitting the validation code, validating, by the validation service provider, at least one of (i) that the preexisting user credential associated with the received unique identifier remains valid, and (ii) that a phone number of the user's smartphone is a phone number associated with a name of the user.

5. The method according to claim 1, further comprising:
    receiving, via the network by the validation service provider from the validation application executing on the user's smartphone, a notification that a biometric has been used to unlock the user's smartphone.

6. The method according to claim 1, further comprising:
    again receiving, via the network by the validation service provider from the validation app executing on the user's smartphone, the preexisting user credential image;
    transmitting, via the network from the validation service provider to a network device of another registrar, the again received preexisting user credential for display by a validation application executing on the other registrar's network device;
    receiving, via the network by the validation service provider from the validation application executing on the other registrar's network device, a request for a smartphone image of the user;
    transmitting, in response to the received request, a request for a smartphone image of the user, via the network from the validation service provider to the user's smartphone for display by the validation app executing on the user's smartphone;
    receiving, via the network by the validation service provider from the validation app executing on the user's smartphone, a smartphone image of the user; and
    transmitting, via the network from the validation service provider to the other registrar's network device, the received smartphone image of the user for display by the validation application executing on the other registrar's network device and for comparison by the other registrar with the image of the user included in the previously transmitted preexisting user credential to thereby validate the user to the other registrar.

7. The method according to claim 6, further comprising:
prior to transmitting the again received preexisting user credential, validating, by the validation service provider, that the again received preexisting user credential remains valid.

8. The method according to claim 6, wherein:
the again received preexisting user credential image is signed with a digital signature of the user; and
the transmitted again received preexisting user credential is the received digitally signed preexisting user credential.

9. The method according to claim 6, wherein:
the received request for a smartphone image of the user is a request for a smartphone image of the user in a particular pose; and
the transmitted request for a smartphone image of the user is a request for a smartphone image of the user in the particular pose.

10. A method of validating the identity of a user, comprising:
receiving, via a network by a validation service provider from a validation app executing on a smartphone of a user, a smartphone image of a preexisting credential of the user including both a biometric of the user and a unique identifier associated with the preexisting user credential;
storing, by the validation service provider, the received smartphone image containing the preexisting credential and the unique identifier that are not previously known to the validation service provider;
receiving, via the network by the validation service provider from a validation application executing on a network device of a registrar seeking to validate the user, the unique identifier associated with the preexisting user credential;
transmitting, via the network in response to receipt of the unique identifier associated with the preexisting user credential, a validation code from the validation service provider to both (a) the user's smartphone for display by the validation app executing on the user's smartphone and (b) the registrar's network device for display by the validation application executing on the registrar's network device;
receiving, via the network by the validation service provider from the validation application executing on the registrar's network device, confirmation that a validation code displayed on the user's smartphone is the transmitted validation, thereby confirming that the user has been validated by the registrar; and
creating an electronic credential bound to the smartphone of the user by associating that biometric credential, the smartphone, the user and the registrar.

11. The method according to claim 10, further comprising:
after receipt of the confirmation, transmitting, via the network, the stored preexisting user credential image from the validation service provider to the registrar's network device for display by the validation application executing on the registrar's network device, and use by the registrar to further validate the user.

12. The method according to claim 10, wherein:
the network is the Internet; and
the preexisting user credential is one of (i) a driver's license including both the user's photograph and a unique driver's license number and (ii) a passport including both the user's photograph and a unique passport number.

13. The method according to claim 10, further comprising:
prior to transmitting the validation code, validating, by the validation service provider, at least one of (i) that the preexisting user credential associated with the received unique identifier remains valid, and (ii) that a phone number of the user's smartphone is a phone number associated with a name of the user.

14. The method according to claim 10, further comprising:
receiving, via the network by the validation service provider from the validation application executing on the user's smartphone, a notification that a biometric has been used to unlock the user's smartphone.

15. The method according to claim 10, further comprising:
again receiving, via the network by the validation service provider from the validation app executing on the user's smartphone, the preexisting user credential image;
transmitting, via the network from the validation service provider to a network device of another registrar, the again received preexisting user credential for display by a validation application executing on the other registrar's network device;
receiving, via the network by the validation service provider from the validation application executing on the other registrar's network device, a request for a smartphone image of the user;
transmitting, in response to the received request, a request for a smartphone image of the user, via the network from the validation service provider to the user's smartphone for display by the validation app executing on the user's smartphone;
receiving, via the network by the validation service provider from the validation app executing on the user's smartphone, a smartphone image of the user; and
transmitting, via the network from the validation service provider to the other registrar's network device, the received smartphone image of the user for display by the validation application executing on the other registrar's network device and for comparison by the other registrar with the image of the user included in the previously transmitted preexisting user credential to thereby validate the user to the other registrar.

16. The method according to claim 15, further comprising:
prior to transmitting the again received preexisting user credential, validating, by the validation service provider, that the again received preexisting user credential remains valid.

17. The method according to claim 15, wherein:
the again received preexisting user credential image is signed with a digital signature of the user; and
the transmitted again received preexisting user credential is the received digitally signed preexisting user credential.

18. The method according to claim 15, wherein:
the received request for a smartphone image of the user is a request for a smartphone image of the user in a particular pose; and
the transmitted request for a smartphone image of the user is a request for a smartphone image of the user in the particular pose.

* * * * *